US010011209B2

(12) United States Patent
Kassian et al.

(10) Patent No.: US 10,011,209 B2
(45) Date of Patent: Jul. 3, 2018

(54) DISTRIBUTING THE LOAD ON THE END OF A SIDE DUMP TRAILER DURING A DUMPING OPERATION

(71) Applicant: The Modern Group, Ltd., Beaumont, TX (US)

(72) Inventors: James Kassian, Parker, CO (US); Gary R. Markham, Lumberton, TX (US)

(73) Assignee: The Modern Group, Ltd., Beaumont, TX (US)

( * ) Notice: Subject to any disclaimer, the term of this patent is extended or adjusted under 35 U.S.C. 154(b) by 65 days.

(21) Appl. No.: 15/183,767

(22) Filed: Jun. 15, 2016

(65) Prior Publication Data
US 2017/0361750 A1    Dec. 21, 2017

(51) Int. Cl.
*B60P 1/28* (2006.01)
*B60P 1/16* (2006.01)

(52) U.S. Cl.
CPC .. *B60P 1/28* (2013.01); *B60P 1/16* (2013.01)

(58) Field of Classification Search
CPC ........... B60P 1/165; B60P 1/283; B60P 1/286; B60P 1/34; B60P 3/122; B60P 1/24; B60P 1/28; B60P 1/32; B60P 3/06
USPC ......... 298/18, 17.7, 17.6, 1 C, 1 V, 11, 17 B, 298/25, 38; 414/470, 111, 372, 809, 812, 414/360, 500, 421
See application file for complete search history.

(56) References Cited

U.S. PATENT DOCUMENTS

| 7,722,125 B1* | 5/2010 | Hehn | B60P 1/165 298/18 |
|---|---|---|---|
| 7,722,126 B2* | 5/2010 | Rogers | B60P 1/165 298/18 |
| 7,866,756 B2* | 1/2011 | Rogers | B60P 1/165 298/17.7 |
| 7,992,942 B2* | 8/2011 | Heider | B60P 1/165 298/17.6 |
| 8,177,304 B2* | 5/2012 | Rogers | B60P 1/34 298/18 |
| 8,220,874 B2 | 7/2012 | Heider et al. | |
| 8,276,989 B2* | 10/2012 | Rogers | B60P 1/165 298/17.5 |
| 9,211,830 B1* | 12/2015 | Hensley | B60P 1/40 |

OTHER PUBLICATIONS www.dragonproductsltd.com, Ranco Side Dump Trailers, Jul. 2014, Modern Group Inc.

* cited by examiner

*Primary Examiner* — D Glenn Dayoan
*Assistant Examiner* — Sunsurraye Westbrook
(74) *Attorney, Agent, or Firm* — Howard L. Speight, PLLC

(57) ABSTRACT

An elongated tub includes a first end and a second end opposite the first end. An A-frame structure includes a force transfer vertex positioned adjacent to a top portion of the first end, a first pivot vertex pivotally and releasably coupled to an elongated frame, and a second pivot vertex pivotally and releasably coupled to the elongated frame. The A-frame structure includes a first force transfer beam coupled to the first end and coupled between the force transfer vertex and the first pivot vertex, a second force transfer beam coupled to the first end and coupled between the force transfer vertex and the second pivot vertex, and a separation beam coupled to the first pivot vertex and the second pivot vertex.

20 Claims, 10 Drawing Sheets

DISTRIBUTING THE LOAD ON THE END OF A SIDE DUMP TRAILER DURING A DUMPING OPERATION

BACKGROUND

Material to be transported from a loading location to a dumping location is loaded into a side dump system consisting of an elongated tub attached to an elongated frame, such as an 18-wheeler frame, railcar frame, or ship, and is transported to a dumping location for unloading. In the dumping process, the elongated tub is rotated causing the material to dump out of the elongated tub. The forces required to rotate the elongated tub are applied to the ends of the elongated tub. The locations on the ends of the elongated tub where the forces are applied are subject to damage, such as fracturing. Dumping the material without damaging the ends of the elongated tub is a challenge.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

In an improved side dump system, the load applied to one end of an elongated tub during a dumping operation is distributed by an A-frame structure to reduce the likelihood of damage to the end of the elongated tub. The effect is analogous to tipping a ceramic bowl filled with rocks by its base rather than by its rim.

Figure 1:
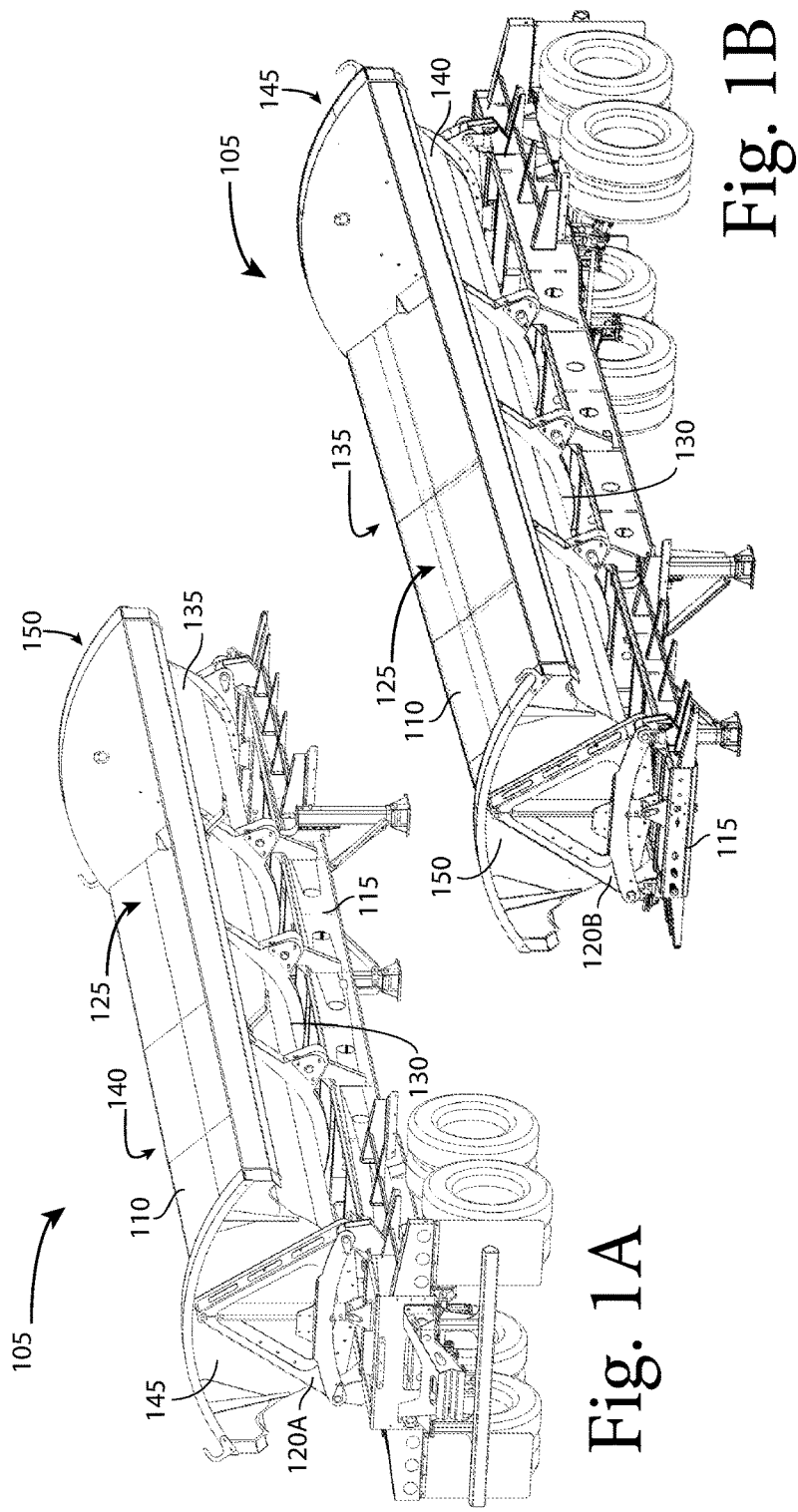
FIG. 1A is a perspective view of a side dump system in a transport position.
FIG. 1B is a perspective view of a side dump system in a transport position.
Figure 2:
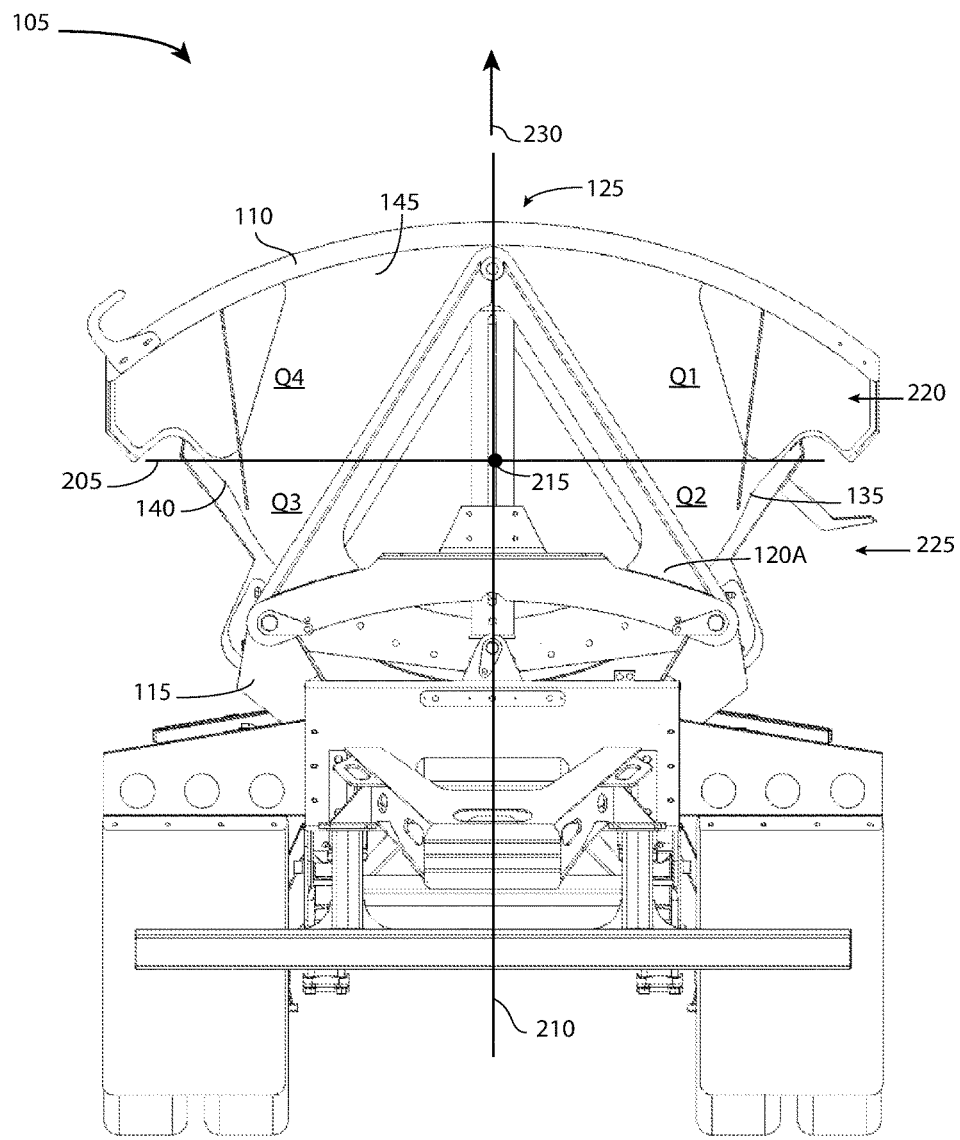
FIG. 2 is a plan view of a side dump system in a transport position.

FIG. 1A-B are perspective views of a side dump system 105 in a transport position. FIG. 2 is a plan view of the side dump system 105 in the transport position. The side dump system 105 includes an elongated tub 110 coupled to an elongated frame 115. The side dump system 105 includes an A-frame structure 120A coupled to the elongated tub 110. The side dump system 105 may include two A-frame structures 120A, 120B coupled to the elongated tub 110. For example, one A-frame structure 120A may be coupled to one end of the elongated tub 110 and another A-frame structure 120B may be coupled to the opposite end of the elongated tub 110. The A-frame structure 120A, 120B is the mechanism that applies the force to rotate the elongated tub 110 from a transport position, shown in FIGS. 1A-1B and 2, to a dump position, shown in FIGS. 4 and 5 (discussed below). Although the figures depict the side dump system 105 as an 18-wheeler truck trailer, it will be understood that elements of the side dump system 105 may be incorporated into a railcar, ship or other modes of transport, including conveyor systems.

The elongated tub 110 is typically in a transport position when material is loaded into the elongated tub 110. As illustrated in FIGS. 1A, 1B and 2, the elongated tub 110 includes an open top 125 and a base 130 opposite the open top 125 (base 130 is shown in FIG. 1A-B, but is hidden by the A-frame structure 120A in FIG. 2). The elongated tub 110 includes a first side 135 and a second side 140 opposite the first side 135. The elongated tub 110 includes a first end 145 extending between an edge of the first side 135 and an edge of the second side 140. The elongated tub 110 includes a second end 150 opposite the first end 145. The second end 150 extends between an edge of the first side 135 and an edge of the second side 140.

For discussion purposes, the elongated tub 110 is divided into four quadrants, as illustrated in FIG. 2. The quadrants are defined by a horizontal line 205 and a vertical line 210 meeting at a centroid 215 of the first end 145 of the elongated tub 110. The horizontal line 205 and the vertical line 210 divide the first end 145 into a first quadrant Q1, a second quadrant Q2, a third quadrant Q3, and a fourth quadrant Q4. The first quadrant Q1 and the fourth quadrant Q4 are separated from the third quadrant Q3 and the second quadrant Q2 by the horizontal line 205 that passes through the centroid 215 of the first end 145 of the elongated tub 110. The first quadrant Q1 and the second quadrant Q2 are separated from the third quadrant Q3 and fourth quadrant Q4 by the vertical line 210 that passes through the centroid 215 of the first end of the elongated tub 110.

The elongated tub 110 is in a transport position when the open top 125 of the elongated tub 110 is facing upward as indicated by arrow 230. A top portion 220 of the first end 145 of the elongated tub 110 is the portion of the first end 145 of the elongated tub 110 that is above the horizontal line 205 when the elongated tub 110 is in the transport position (i.e., quadrants Q1 and Q4), as shown in FIGS. 1A, 1B, and 2. A bottom portion 225 of the first end 145 of the elongated tub 110 is the portion of the first end 145 of the elongated tub 110 that is below the horizontal line 205 when the elongated tub 110 is in the transport position (i.e., quadrants Q2 and Q3). The second end 150 has a top portion and a bottom portion which are not shown in FIG. 2 but are defined similarly to the top portion 220 and bottom portion 225 of the first end 145 (see FIG. 6B described below).

Figure 3:
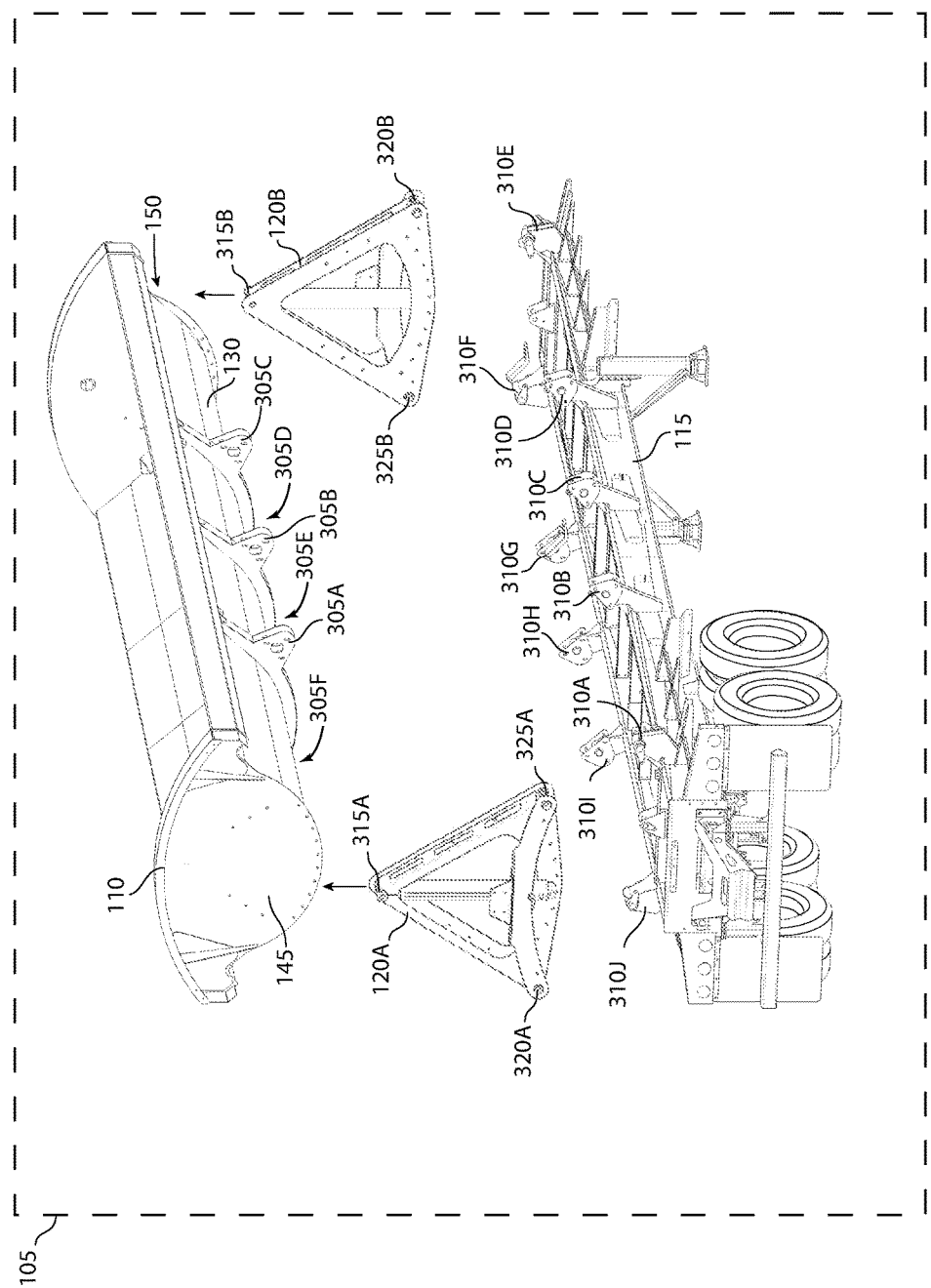
FIG. 3 is an exploded perspective view of a side dump system in a transport position.

FIG. 3 is an exploded perspective view of the side dump system 105 in the transport position. As illustrated in FIG. 3, the elongated tub 110, the elongated frame 115, and the A-frame structures 120A, 120B are individual components that are assembled to form the side dumping system 105. The elongated tub 110 is couplable to the elongated frame 115. In one more embodiments, the elongated tub 110 includes a plurality of mounting clasps 305 (referring to mounting clasps 305A-F) that can be coupled to the base 130 of the elongated tub 110. Note, only three mounting clasps 305A-C are visible in FIG. 3. The location of mounting clasps 305D-F are indicated by the arrows labeled as 305D-F. Although FIG. 3 shows six mounting clasps 305, it will be understood that the elongated tub 110 may include fewer than or more than six mounting clasps 305.

The elongated frame 115 includes a plurality of pivot hooks 310 (referring to pivot hooks 310A-J) that are pivotally and releasably couplable to the mounting clasps 305. During assembly, mounting clasp 305A couples to pivot hook 310B, mounting clasp 305B couples to pivot hook 310C, mounting clasp 305C couples to pivot hook 310D, mounting clasp 305D couples to pivot hook 310G, mounting clasp 305E couples to pivot hook 310H, and mounting clasp 305F couples to pivot hook 310I. Coupling the mounting clasp 305 to the mounting hooks 310 secures the elongated tub 110 to the elongated frame 115 during transport. In addition, the mounting clasps 305A-F and pivot hooks 310A-J provide points of rotation around which the elongated tub 110 may be rotated from the transport position to the dumping position. Note that pivot hooks 310A, 310E, 310F, and 310J provide couplings for the A-frame structures 120A, 120B, as described below, and may be differently configured than pivot hooks 310B-D and 310G-I to allow that coupling.

The A-frame structure 120A is coupled to the first end 145 of the elongated tub 110. The A-frame structure 120A includes a force transfer vertex 315A, a first pivot vertex 320A, and a second pivot vertex 325A. The A-frame structure 120B is coupled to the second end 150 of the elongated tub 110. The A-frame structure 120B includes a force transfer vertex 315B, a first pivot vertex 320B, and a second pivot vertex 325B.

When the A-frame structure 120A is coupled to the first end 145 of the elongated tub 110, the force transfer vertex 315A is positioned adjacent the top portion 220 of the first end 145. The first pivot vertex 320A is positioned below the horizontal line 205 and on a first side of the vertical line 210 (e.g., quadrant Q3), and the second pivot vertex 325A is positioned below the horizontal line 205 on a second side of the vertical line 210 opposite the first side of the vertical line 210 (e.g., quadrant Q2). The A-frame structure 120B is similarly coupled to the second end 150 of the elongated tub 110.

Once the side dump system 105 is assembled, the first pivot vertex 320A and the second pivot vertex 325A of the A-frame structure 120A are pivotally and releasably coupled to the elongated frame 115. Similarly, the first pivot vertex 320B and the second pivot vertex 325B of the A-frame structure 120B are pivotally and releasably coupled to the elongated frame 115. That is, once the side dump system 105 is assembled, the first pivot vertex 320A is pivotally and releasably coupled to pivot hook 310J, the second pivot vertex 325A is pivotally and releasably coupled to pivot hook 310A, the first pivot vertex 320B is pivotally and releasably coupled to pivot hook 310E, and second pivot vertex 325B is pivotally and releasably coupled to pivot hook 310F. "Pivotally" is defined to mean "capable of acting as a pivot point." "Releasably" is defined to mean "capable of being released." Thus, the first pivot vertex 320A can act as a pivot for the A-frame structure 120A when it is coupled to pivot hook 310J and the first pivot vertex 320A can be released from the pivot hook 310J. Similarly, the second pivot vertex 325A can act as a pivot for the A-frame structure 120A when it is coupled to pivot hook 310A and the second pivot vertex 325A can be released from the pivot hook 310A, the first pivot vertex 320B can act as a pivot for the A-frame structure 120B when it is coupled to pivot hook 310E and the first pivot vertex 320B can be released from the pivot hook 310E, and the second pivot vertex 325B can act as a pivot for the A-frame structure 120B when it is coupled to pivot hook 310F and the first pivot vertex 325B can be released from the pivot hook 310F.

Figure 4:
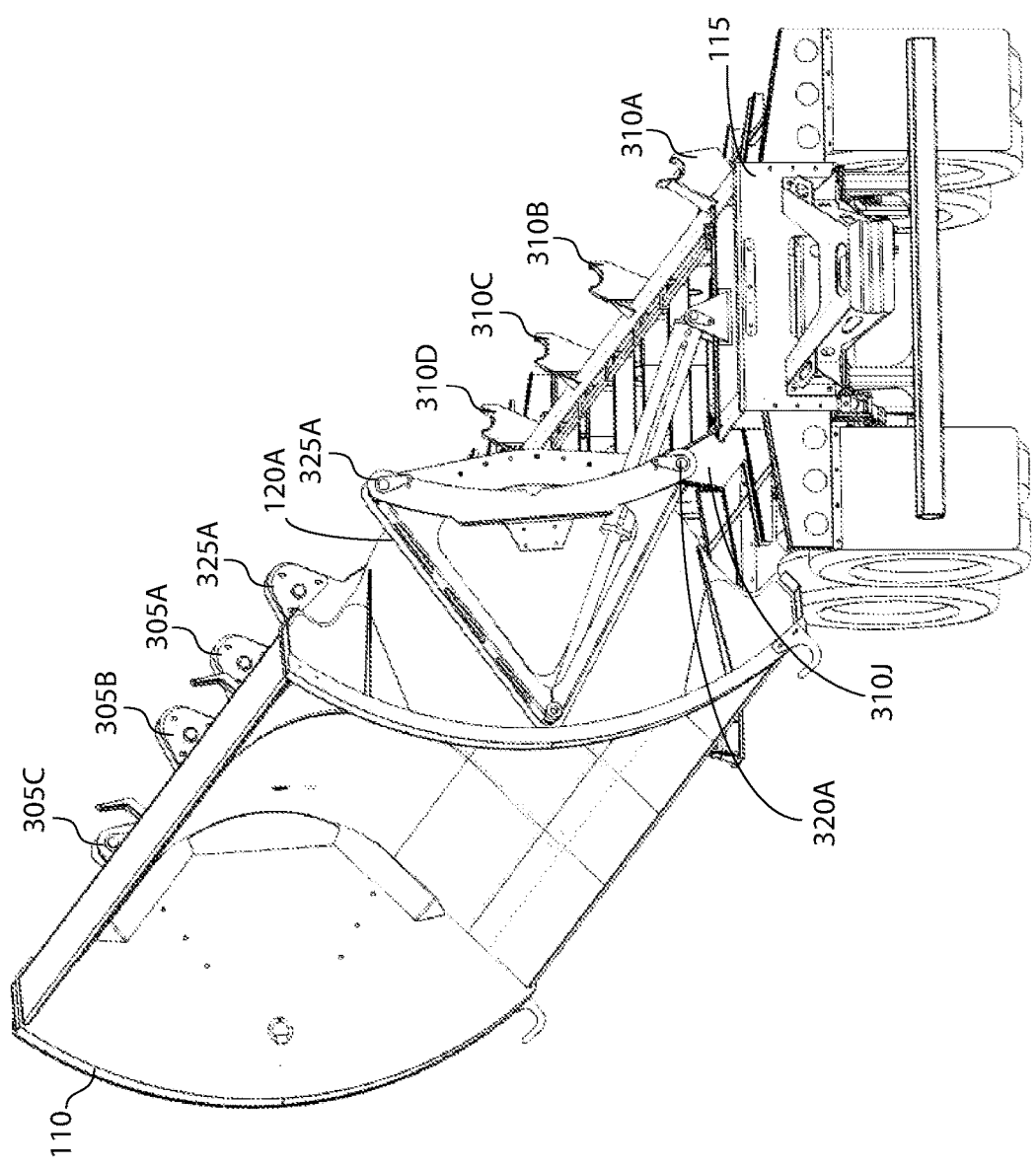
FIG. 4 is perspective view of a side dump system in a dumping position.
Figure 5:
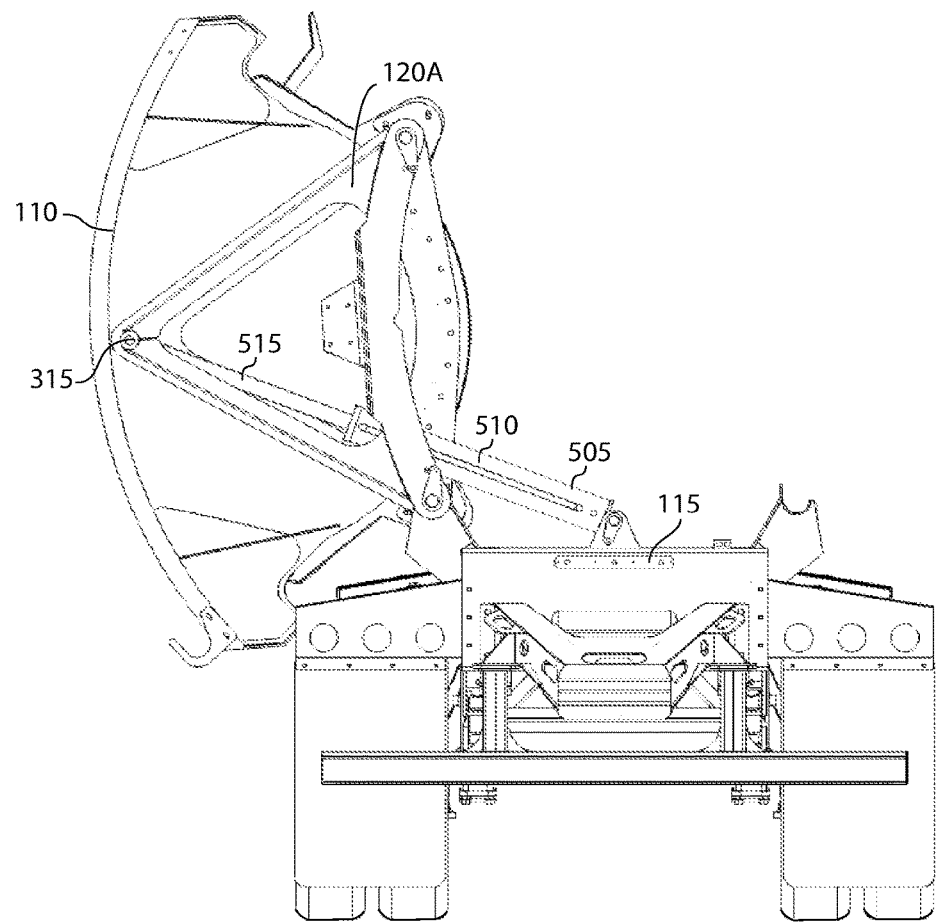
FIG. 5 is a plan view of a side dump system in a dumping position.

FIG. 4 is a perspective view of the side dump system 105 in the dumping position. FIG. 5 is a plan view of the side dump system 105 in the dumping position. As illustrated in FIG. 4, to move the elongated tub 110 from the transport position to the dumping position an operator (not shown) uncouples (or releases) a first set of mounting clasps, such as mounting clasps 305A-C, the second pivot vertex 325A on A-frame structure 120A, and the first pivot vertex 320B (hidden in FIG. 5 by the elongated tub 110 but shown in FIG. 3) on A-frame structure 120B from the corresponding pivot hooks 310A-E (pivot hook 310E is hidden in FIG. 5 by the elongated tub 110 but is shown in FIG. 3), while mounting clasps 305D-F, first pivot vertex 320A on A-frame structure 120A, and second pivot vertex 325B on A-frame structure 120B remain pivotally coupled to corresponding pivot hooks 310F-J (mounting clasps 305D-F, second pivot vertex 325B and pivot hooks 310F-I are hidden in FIG. 5 by the elongated tub 110 but are shown in FIG. 3). Although FIGS. 4 and 5 show the elongated tub 110 positioned in one dumping direction (i.e., dumping to the left side of FIG. 4 and FIG. 5), it will be understood that the elongated tub 110 may be positioned in the opposite dumping direction (i.e., dumping to the right side of FIG. 4 and FIG. 5). Dumping in the opposite direction as that shown in FIG. 4 and FIG. 5 requires releasing mounting clasps 305D-F, the first pivot vertex 320A on A-frame structure 120A, and the second pivot vertex 325B on A-frame structure 120B from a pivot hooks 310F-J, while the mounting clasps 305A-C, the second pivot vertex 325A on A-frame structure 120A, and first pivot vertex 320B on A-frame structure 120B remain pivotally coupled to corresponding pivot hooks 310A-E.

To rotate the elongated tub 110 from the transport position to the dumping position, as illustrated in FIG. 5, force is applied to the A-frame structure 120A by a hydraulic assembly 505 coupled between the force transfer vertex 315 of the A-frame structure 120A and the elongated frame 115. The hydraulic assembly 505 includes a cylinder 510 and a rod 515 that is telescoped at least partially within the cylinder 510. The cylinder 510 is pivotally coupled to the elongated frame 115. The rod 515 is pivotally coupled to the force transfer vertex 315. A similar hydraulic assembly (not shown in FIG. 5) is coupled between the A-frame structure 120B and the elongated frame 115.

Figures 6A, 6B:
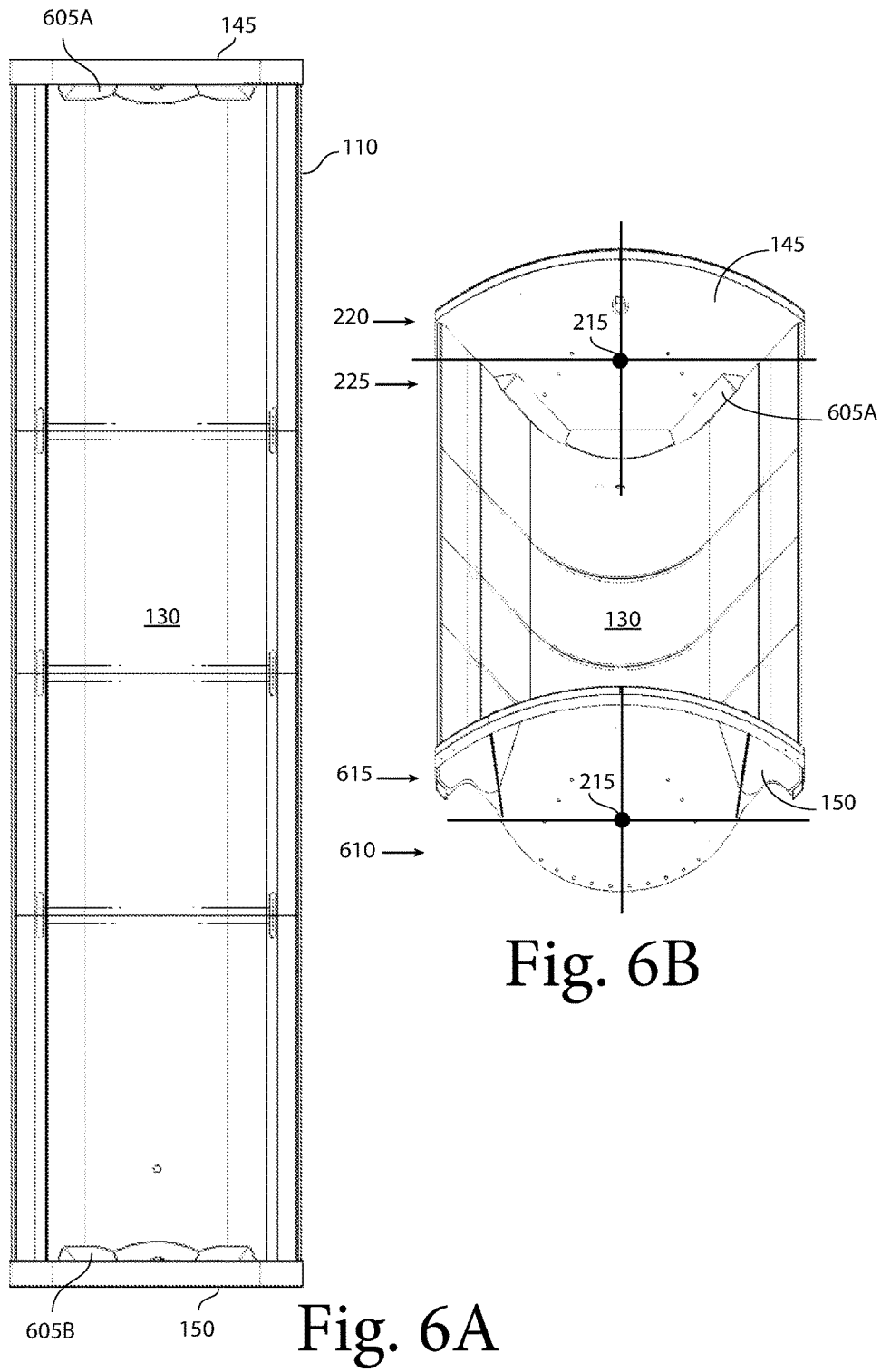
FIG. 6A is a plan view of an elongated tub reinforced by a gusset assembly.
FIG. 6B is a perspective view of an elongated tub reinforced by a gusset assembly.

FIG. 6A is a plan view of the elongated tub 110 reinforced by gusset assemblies 605A, 605B. FIG. 6B is a perspective view of the elongated tub 110 reinforced by the gusset assemblies 605A, 605B. As illustrated in FIG. 6A, the elongated tub 110 includes gusset assemblies 605A, 605B. The gusset assembly 605A is coupled to the first end 145 of the elongated tub 110 and the gusset assembly 605B is coupled to the second end 150 of the elongated tub 110. As illustrated in FIG. 6B, the gusset assembly 605A is coupled (e.g., welded) to the bottom portion 225 of the first end 145. The gusset assembly 605B is similarly coupled (e.g., welded) to a bottom portion 610 of the second end 150, where the second end 150 of the elongated tub 110 has a bottom portion 610 and a top portion 615 similar to the top portion 220 and bottom portion 225 of the first end 145 of the elongated tub 110. The gusset assemblies 605A, 605B stiffen and strengthen the bottom portion 225 of the first end 145 and the bottom portion 610 of the second end 150 of the elongated tub 110.

Figure 7:
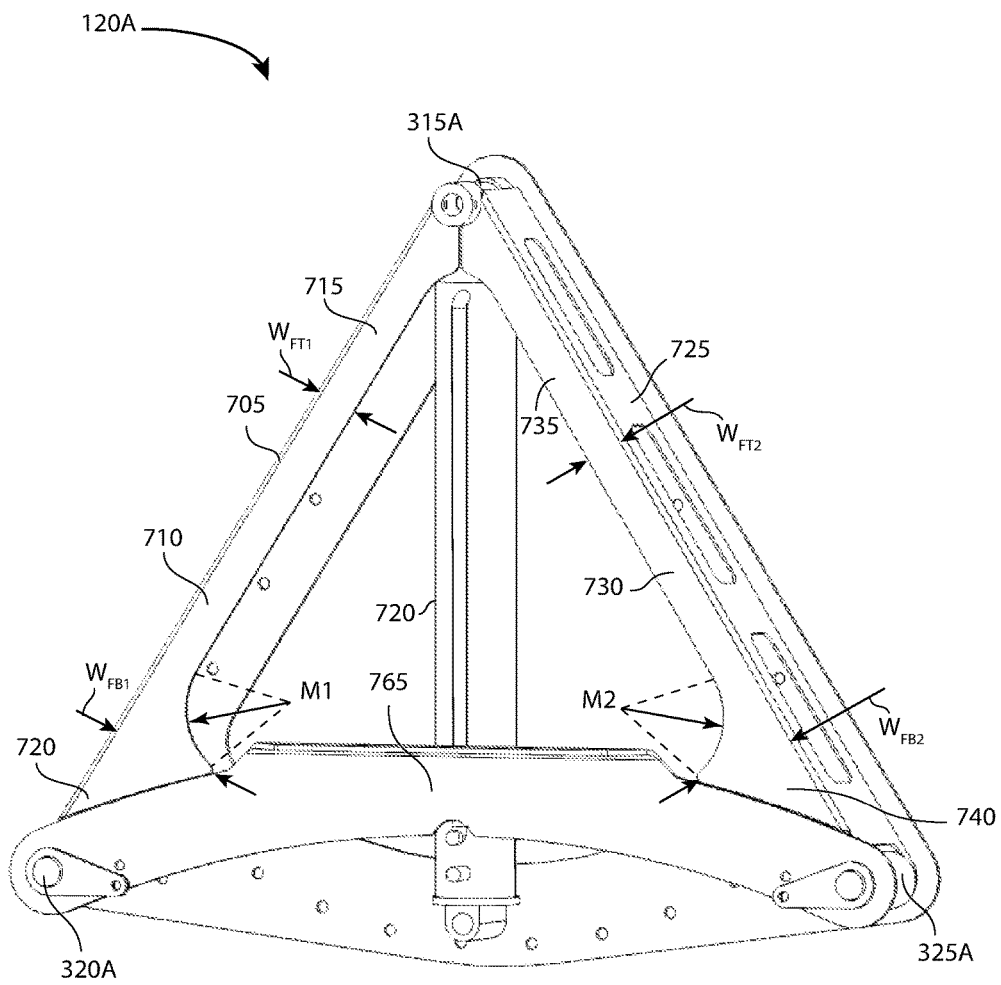
FIG. 7 is a perspective view of an A-frame structure.

FIG. 7 is a perspective view of the A-frame structure 120A (the A-frame structure 120B is similar to the A-frame structure 120A and will not be described separately). As illustrated in FIG. 7 (and described in connection with FIGS. 2-3), the A-frame structure 120A includes the force transfer vertex 315A, the first pivot vertex 320A, and the second pivot vertex 325A. The A-frame structure 120A includes a first force transfer beam 705 coupled between the force transfer vertex 320A and the first pivot vertex 315A. The first force transfer beam 705 is coupled to the first end 145 of the elongated tub 110 through a mounting frame 805 (described in connection with FIG. 8). In one or more embodiments, the first force transfer beam 705 is bolted, welded, or otherwise secured to the mounting frame 805. The first force transfer beam 705 includes a first flange 710. The first flange 710 includes a first flange top section 715 and a first flange bottom section 720 integral with the first flange top section 715. The first flange top section 715 has a width $W_{FT1}$. The first flange bottom section 720 has a variable width $W_{FB1}$ that is equal to $W_{FT1}$ where the first flange top section 715 joins the first flange bottom section 720 and gradually increases with distance from that point. In one or more embodiments, the increase in $W_{FB1}$ follows a radius of curvature M1. In one or more embodiments, $W_{FT1}$>1 inch. In one or more embodiments, $W_{FT1}$>2 inches. In one or more embodiments, $W_{FT1}$>3 inches. In one or more embodiments, M1>1 inch. In one or more embodiments, M1>3 inches. In one or more embodiments, M1>5 inches.

The A-frame structure 120A includes a second force transfer beam 725 coupled between the force transfer vertex 315A and the second pivot vertex 325A. The second force transfer beam 725 is coupled to the first end 145 of the elongated tub 110 through the mounting frame 805 (described in connection with FIG. 8). In one or more embodiments, the second force transfer beam 725 is bolted, welded, or otherwise secured to the mounting frame 805.

The second force transfer beam 725 includes a second flange 730. The second flange 730 includes a second flange top section 735 and a second flange bottom section 740 integral with the second flange top section 735. The second flange top section 735 has a width $W_{FT2}$. The second flange bottom section 740 has a variable width $W_{FB2}$ that is equal to $W_{FT2}$ where the second flange top section 735 joins the second flange bottom section 740 and gradually increases with distance from that point. In one or more embodiments, the increase in $W_{FB2}$ follows a radius of curvature M2. In one or more embodiments, $W_{FT2}$>1 inch. In one or more embodiments, $W_{FT2}$>2 inches. In one or more embodiments, $W_{FT2}$>3 inches. In one or more embodiments, M2>1 inch. In one or more embodiments, M2>3 inches. In one or more embodiments, M2>5 inches.

The A-frame structure 120A includes a separation beam 765 coupled to the first pivot vertex 320A and the second pivot vertex 325A. The separation beam 765 maintains a constant separation between the first pivot vertex 320A and the second pivot vertex 325A even when forces are applied to the force transfer vertex 315A. In one or more embodiments, the separation beam 765 is curved.

Figure 8:
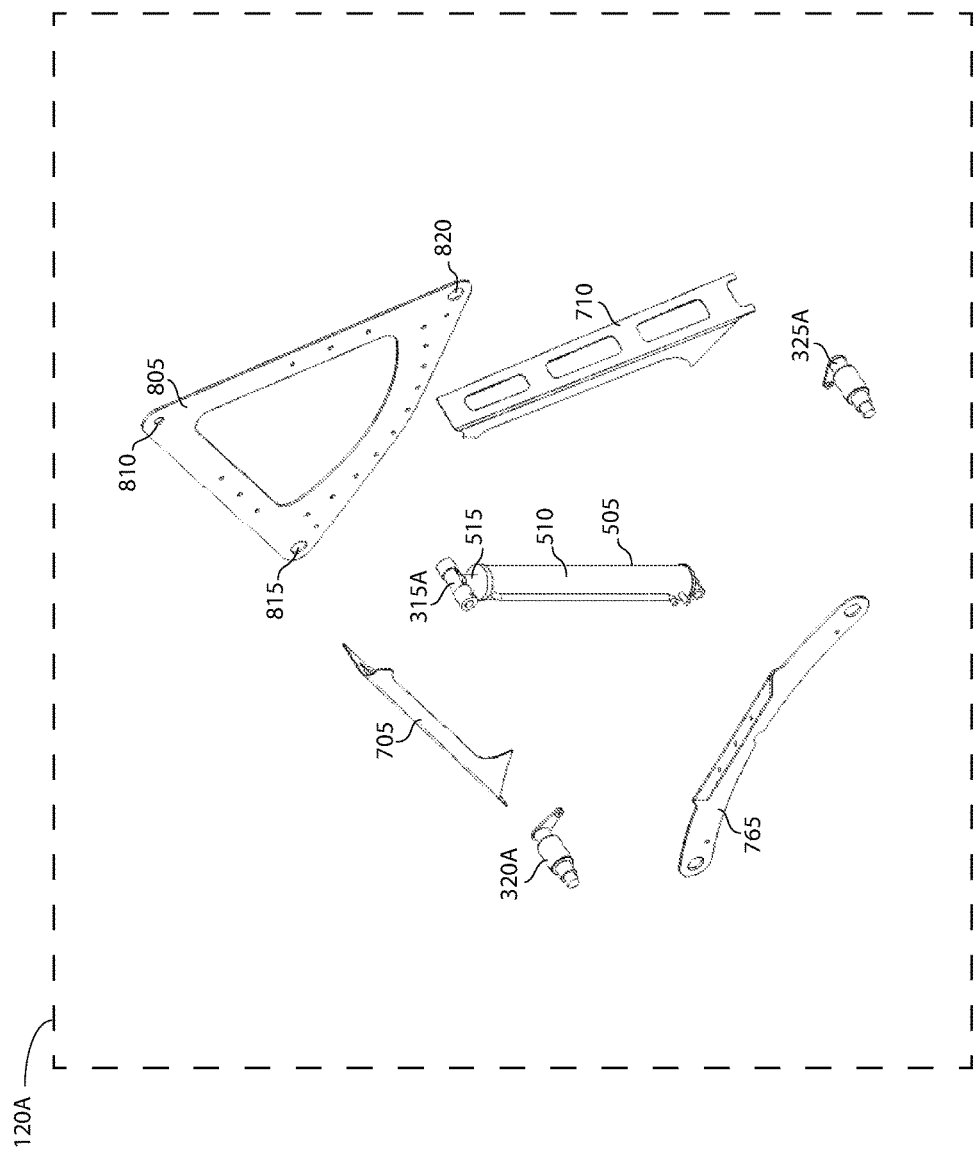
FIG. 8 is an exploded perspective view of the A-frame structure of FIG. 7.

FIG. 8 is an exploded perspective view of the A-frame structure 120A of FIG. 7 (the A-frame structure 120B is similar to the A-frame structure 120A and will not be described separately). The force transfer vertex 315A is pivotally coupled to the mounting frame 805 at mounting location 810. The first pivot vertex 320A is pivotally coupled to the mounting frame 805 at mounting location 815. The second pivot vertex 325A is pivotally coupled to the mounting frame 805 at mounting location 820. In one or more embodiments, the first force transfer beam 705 is coupled to the mounting frame 805 by riveting, welding, using an adhesive, bolting, or other appropriate coupling technique. In one or more embodiments, the second force transfer beam 725 is coupled to the mounting frame 805 by riveting, welding, using an adhesive, bolting, or other appropriate coupling technique. In one or more embodiments, the hydraulic assembly 505 passes between the separation beam 765 and the mounting frame 805. In one or more embodiments, the cylinder 510 passes between the separation beam 765 and the mounting frame 805.

Figure 9:
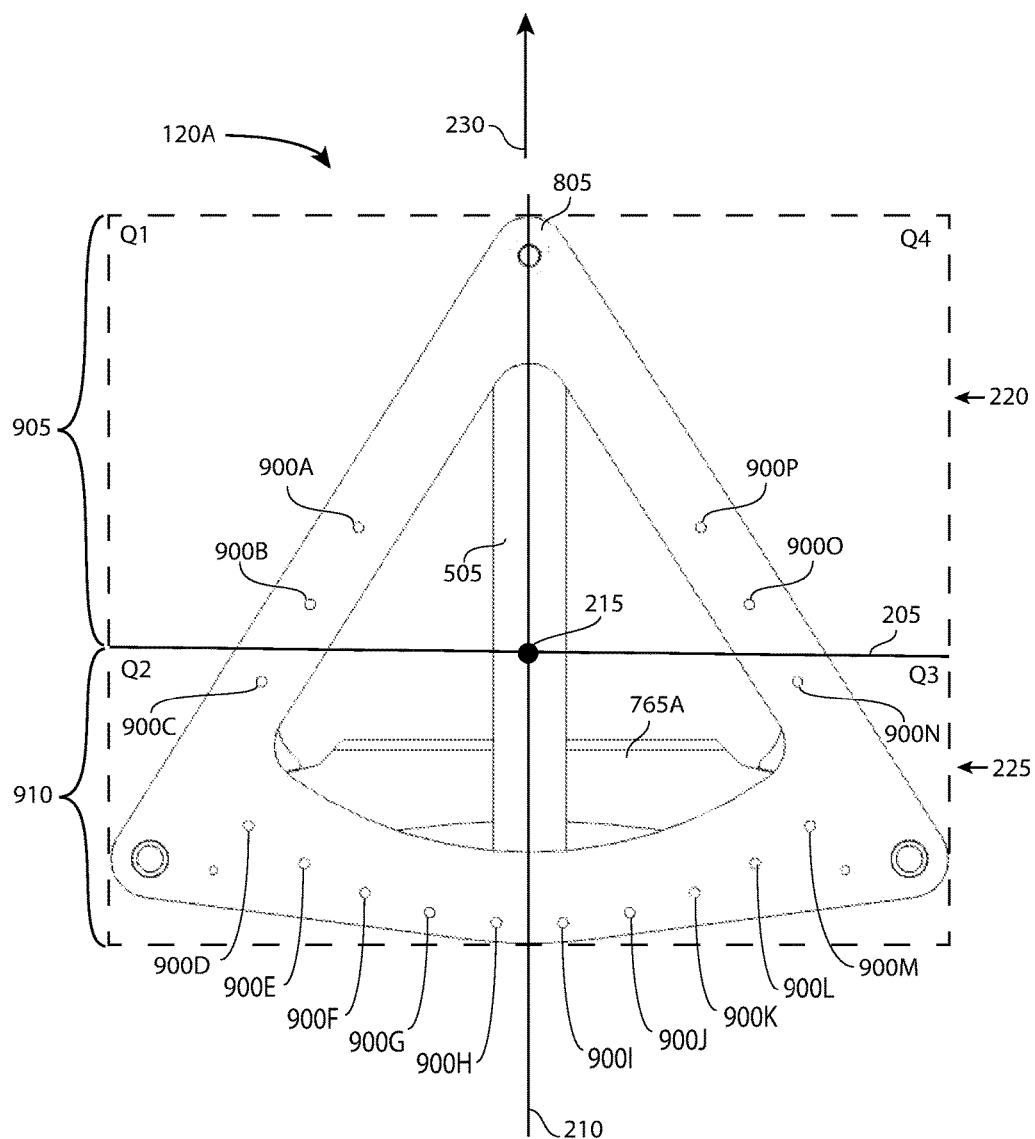
FIG. 9 is a plan view of a mounting frame element of the A-frame structure of FIG. 7.

FIG. 9 is a plan view of the mounting frame 805 coupled to the A-frame structure 120A of FIG. 7 (A-frame structure 120B is coupled to a mounting frame similar to mounting frame 805 and is not described separately). As illustrated in FIG. 9, the A-frame structure 120A (only the hydraulic assembly 505 and separation beam 765A of the A-frame 120A are visible) includes the mounting frame 805. The mounting frame 805 includes holes 900 (referring to holes 900A-P). In one or more embodiments, the mounting frame 805 is coupled to the first end 145 of the elongated tub 110 using some or all of the holes 900A-P. Although FIG. 9 illustrates the mounting frame 805 with 16 holes, it will be understood that the A-frame structure 120 may include more or fewer holes.

When fastening the mounting frame 805 to the elongated tub 110, the mounting frame 805 is divided along the four quadrants described in reference to FIG. 2 and reproduced in FIG. 9. Note that the quadrants in FIG. 9 are reversed from those shown in FIG. 2 because FIG. 9 shows the A-frame structure 120A from the opposite direction. The mounting frame 805 includes a top mounting frame section 905. The top mounting frame section 905 is the portion of the mounting frame 805 above the horizontal line 205. For example, the portion of the mounting frame 805 that is in the first quadrant Q1 and the fourth quadrant Q4 is the top mounting frame section 905. The mounting frame 805 includes a bottom mounting frame section 910. The bottom mounting frame section 910 is the portion of the mounting frame 805 below the horizontal line 205. For example, the portion of the mounting frame that is in the second quadrant Q2 and the third quadrant Q3 is the bottom mounting frame section 910.

The mounting frame 805 is coupled to the first end 145 of the elongated tub 110 (the elongated tub 110 is not shown in FIG. 9, but is shown in FIGS. 1-2, and 4-5) such that when the elongated tub 110 is oriented so that the open top 125 of the elongated tub 110 is facing upward 230, the bottom mounting frame section 910 is directly coupled (i.e., by rivets, bolts, adhesives, welds, or other coupling technique) to the bottom portion 225 of the first end 145 (i.e. below the horizontal line 205 and centroid 215 of the elongated tub 110). For example, in one or more embodiments as illustrated in FIG. 9, holes 900A-B and 900O-P would not be used to couple the mounting frame 805 to the first end 145 of the elongated tub 110, whereas holes 900C-N would be used to couple the mounting frame 805 to the first end 145 of the elongated tub 110. Coupling the mounting frame 805 to the first end 145 below the horizontal line 205 of the first end 145 of the elongated tub 110 distributes the load caused by the force exerted by the hydraulic assembly 505 to the base 130, the gusset assemblies 650A, 650B, and the bottom portion 225 of the first end 145 of the elongated tub 110. This reduces the likelihood of damaging the first end 145 of the elongated tub 110 as compared to applying the force to the top portion 220 of the first end 145 of the elongated tub 110.

Figure 10:
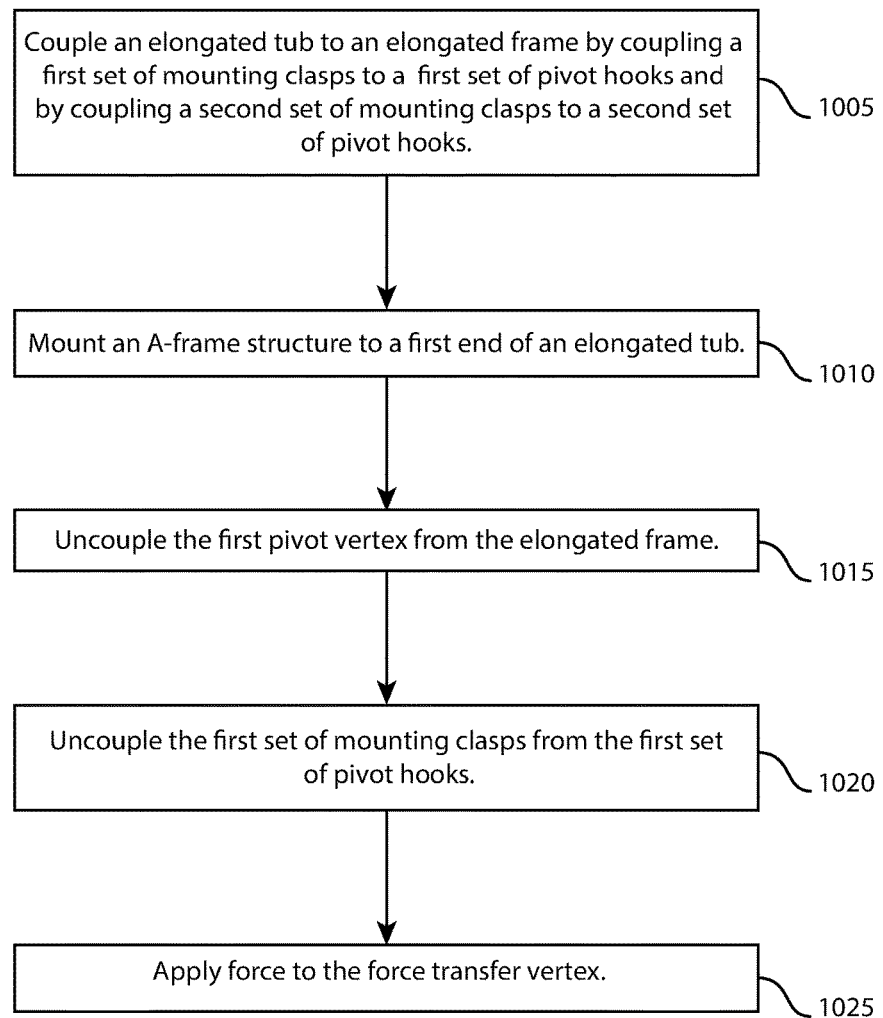
FIG. 10 is a flow chart showing the dumping process.

FIG. 10 is a flow chart showing the dumping process. An elongated tub (such as elongated tub 110) is coupled to an elongated frame (such as elongated frame 115) by coupling a first set of mounting clasps (such as mounting clasps 305A-C, the second pivot vertex 325A on A-frame structure 120A, and the first pivot vertex 320B on A-frame structure 120B) to a first set of pivot hooks (such as pivot hooks 310A-E) and by coupling a second set of mounting clasps (such as mounting clasps 305D-F, the second pivot vertex 325A on A-frame structure 120A, and the first pivot vertex 320 on A-frame structure 120B) to a second set of pivot hooks (such as pivot hooks 310F-J) (block 1005). An A-frame structure (such as A-frame structure 120A) is mounted to a first end (such as first end 145) of an elongated tub (such as elongated tub 110)(similarly A-frame structure 120B is mounted to the second end 150 of the elongated tub 110) (block 1010), the A-frame structure (such as A-frame structure 120A) having a first pivot vertex (such as first pivot vertex 320A) pivotally and releasably coupled to the elongated frame (such as by pivot hook 310J on elongated frame 115), a second pivot vertex (such as second pivot vertex 325A) pivotally and releasably coupled to the elongated frame (such as by pivot hook 310A on elongated frame 115), a force transfer vertex (such as force transfer vertex 315A), a first force transfer beam (such as first force transfer beam 705) coupling the first pivot vertex (such as first pivot vertex 320A) to the force transfer vertex (such as force transfer vertex 315A), and a second force transfer beam (such as second force transfer beam 725) coupling the second pivot vertex (such as second pivot vertex 325A) to the force transfer vertex (such as force transfer vertex 315A)(similarly, A-frame structure 120B is pivotally and releasably coupled to the elongated frame 115 by pivotally and releasably coupling first pivot vertex 320B to pivot hook 310E and by pivotally and releasably coupling second pivot vertex 325B to pivot hook 310F). Note that blocks 1005 and 1010 are performed as the side dump system 105 is being assembled.

The first pivot vertex (such as first pivot vertex 320A) is uncoupled from the elongated frame (e.g., by releasing first pivot vertex 320A from pivot hook 310J) (block 1015). A second pivot vertex (such as first pivot vertex 325B) is uncoupled from the elongated frame (e.g., by releasing the first pivot vertex 325B from pivot hook 310F) The first set of mounting clasps (such as mounting clasps 305D-F) is uncoupled from the first set of pivot hooks (such as pivot hooks 310G-I) (block 1020). Force is applied to a force transfer vertex (such as force transfer vertex 315A and/or force transfer vertex 315B) (block 1025) wherein the force applied to the force transfer vertex (such as force transfer vertex 315A) is directed along the first force transfer beam (such as first force transfer beam 705) to the first pivot vertex (such as first pivot vertex 320A) and along the second transfer beam (such as second transfer beam 725) to the second pivot vertex (such as second pivot vertex 325A), causing the force transfer vertex (such as force transfer vertex 315A) to move in an arc about the second pivot vertex (such as second pivot vertex 325A), causing the elongated tub (such as elongated tub 110) to pivot from a transport position, in which an open top (such as open top 125) is facing upward (indicated by arrow 230), to a dumping position in which the open top (such as open top 125) is facing away from one side of the elongated frame (such as elongated frame 110).

In one aspect, an apparatus includes an elongated frame and an elongated tub. The elongated tub includes an open top, a first side, and a second side opposite the first side. The elongated tub includes a first end extending between an edge of the first side and an edge of the second side, a second end opposite the first end, and a base side opposite the open top. The apparatus includes an A-frame structure. The A-frame structure includes a force transfer vertex positioned adjacent to a top portion of the first end, a first pivot vertex pivotally and releasably coupled to the elongated frame, and a second pivot vertex pivotally and releasably coupled to the elongated frame. The A-frame structure includes a first force transfer beam coupled to the first end and coupled between the force transfer vertex and the first pivot vertex, a second force transfer beam coupled to the first end and coupled between the force transfer vertex and the second pivot vertex, and a separation beam coupled to the first pivot vertex and the second pivot vertex. The apparatus includes a hydraulic assembly. The hydraulic assembly includes a cylinder and a rod that is telescoped at least partially within the cylinder, wherein the cylinder is pivotally coupled to the elongated frame, and the rod is pivotally coupled to the force transfer vertex.

Implementations may include one or more of the following. The base side and a lower portion of the first end may be reinforced by a first gusset assembly. The base side and a lower portion of the second end may be reinforced by a second gusset assembly. The A-frame structure may be decoupleable from the elongated tub. The first force transfer beam may be bolted to the first end and the second force transfer beam may be bolted to the first end. The separation beam may be curved. The top portion of the first end may be above, when the tub is oriented so that the open top of the tub is facing upward, a horizontal line through a centroid of the first end. The first pivot vertex may be located below the horizontal line and on a first side of a vertical line through the centroid of the first end. The second pivot vertex may be located below the horizontal line and on a second side, opposite the first side, of the vertical line. The A-frame structure may include a mounting frame. The mounting frame may include a top mounting frame section directly coupled to the first force transfer beam and the second force transfer beam. The mounting frame may include a bottom mounting frame section directly coupled to the bottom portion of the first end, the first force transfer beam, and the second force transfer beam. The top mounting frame section may not be coupled to the top portion of the first end. The cylinder may pass between the separation beam and the mounting frame. The first force transfer beam may include a first flange. The first flange may include a first flange top section having a width $W_{FT1}$, and a first flange bottom section integral with the first flange top section and having a variable width $W_{FB1}$ that is equal to $W_{FT1}$ where the first flange top section joins the first flange bottom section and increases with distance from that point. The second force transfer beam may include a second flange. The second flange may include a second flange top section having a width $W_{FT2}$, and a second flange bottom section integral with the second flange top section and having a variable width $W_{FB2}$ that is equal to $W_{FT2}$ where the second flange top section 735 joins the second flange bottom section 740 and increases with distance from that point. The separation beam may include a separation beam stiffening flange integral to and perpendicular to the separation beam.

In one aspect, an apparatus includes an A-frame structure. The A-frame structure includes a force transfer vertex, a first pivot vertex, a second pivot vertex, and a first force transfer beam coupled between the force transfer vertex and the first pivot vertex. The A-frame structure includes a second force transfer beam coupled to the first end and coupled between the force transfer vertex and the second pivot vertex. The A-frame structure includes a separation beam coupled to the first pivot vertex and the second pivot vertex. The apparatus includes a hydraulic assembly having a cylinder and a rod that is telescoped at least partially within the cylinder, wherein the rod is pivotally coupled to the force transfer vertex.

Implementations may include one or more of the following. The A-frame structure may be coupleable to an elongated tub and to an elongated frame. The separation beam may be curved. The A-frame structure may include a mounting frame. The mounting frame may include a top mounting frame section pivotally coupled to the force transfer vertex. The top mounting frame section may be coupled to the first force transfer beam and the second force transfer beam. The mounting frame may include a bottom mounting frame section pivotally coupled to the first pivot vertex and the second pivot vertex. The bottom mounting frame section may be directly coupled to the first force transfer beam, and the second force transfer beam. The cylinder may pass between the separation beam and the mounting frame. The first force transfer beam may include a first flange. The first flange may include a first flange top section having a width $W_{FT1}$, and a first flange bottom section integral with the first flange top section and having a variable width $W_{FB1}$ that is equal to $W_{FT1}$ where the first flange top section joins the first flange bottom section and increases with distance from that point. The second force transfer beam may include a second flange. The second flange may include a second flange top section having a width $W_{FT2}$, and a second flange bottom section integral with the second flange top section and having a variable width $W_{FB2}$ that is equal to $W_{FT2}$ where the second flange top section joins the second flange bottom section and gradually increases with distance from that point. The separation beam may include a separation beam stiffening flange integral to and perpendicular to the separation beam.

In one aspect, a method includes coupling an elongated tub to an elongated frame by coupling a first set of mounting clasps to a first set of pivot hooks and by coupling a second set of mounting clasps to a second set of pivot hooks. An A-frame structure is mounted to a first end of an elongated tub. The A-frame structure includes a first pivot vertex pivotally and releasably coupled to the elongated frame, a second pivot vertex pivotally and releasably coupled to the elongated frame, and a force transfer vertex. The A-frame structure includes a first force transfer beam coupling the first pivot vertex to the force transfer vertex and a second force transfer beam coupling the second pivot vertex to the force transfer vertex. The first set of mounting clasps is uncoupled from the first set of pivot hooks and force is applied to the force transfer vertex. The force applied to the force transfer vertex is directed along the first force transfer beam to the first pivot vertex and along the second transfer beam to the second pivot vertex. The force causes the force transfer vertex to move in an arc about the second pivot vertex, causing the elongated tub to pivot from a transport position, in which an open top is facing upward, to a dumping position in which the open top is facing away from one side of the elongated frame.

Implementation may include one or more of the following. Applying the force may include applying force below a centroid of the first end of the elongated tub. Applying the force may include applying force to a lower portion of a mounting frame, wherein the lower portion of the mounting frame is coupled to a lower portion of the first end of the elongated tub.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:
1. An apparatus comprising:
an elongated frame;
an elongated tub having:
   an open top,
   a first side,
   a second side opposite the first side,
   a first end extending between an edge of the first side and an edge of the second side,
   a second end opposite the first end; and
   a base side opposite the open top;
an A-frame structure having:
   a force transfer vertex positioned adjacent to a top portion of the first end,
   a first pivot vertex pivotally and releasably coupled to the elongated frame,
   a second pivot vertex pivotally and releasably coupled to the elongated frame,
   a first force transfer beam coupled to the first end and coupled between the force transfer vertex and the first pivot vertex,
   a second force transfer beam coupled to the first end and coupled between the force transfer vertex and the second pivot vertex, and
   a separation beam, separate from the elongated frame and the elongated tub, coupled to the first pivot vertex and the second pivot vertex;
a hydraulic assembly having a cylinder and a rod that is telescoped at least partially within the cylinder;
wherein the cylinder is pivotally coupled to the elongated frame; and
wherein the rod is pivotally coupled to the force transfer vertex.

2. The apparatus of claim 1 wherein the base side and a lower portion of the first end is reinforced by a first gusset assembly and the base side and a lower portion of the second end is reinforced by a second gusset assembly.

3. The apparatus of claim 1 wherein the A-frame structure is decouplable from the elongated tub.

4. The apparatus of claim 1 wherein the first force transfer beam is bolted to the first end and second force transfer beam is bolted to the first end.

5. The apparatus of claim 1 wherein:
the top portion of the first end is above, when the tub is oriented so that the open top of the tub is facing upward, a horizontal line through a centroid of the first end;
the first pivot vertex is located below the horizontal line and on a first side of a vertical line through the centroid of the first end; and
the second pivot vertex is located below the horizontal line and on a second side, opposite the first side, of the vertical line.

6. The apparatus of claim 5 wherein the A-frame structure further comprises:
a mounting frame having:
a top mounting frame section directly coupled to:
the first force transfer beam, and
the second force transfer beam;
a bottom mounting frame section directly coupled to:
the bottom portion of the first end,
the first force transfer beam, and
the second force transfer beam;
wherein the top mounting frame section is not coupled to the top portion of the first end.

7. The apparatus of claim 6 wherein the cylinder passes between the separation beam and the mounting frame.

8. The apparatus of claim 1 wherein the first force transfer beam comprises:
a first flange having:
a first flange top section having a width $W_{FT1}$, and
a first flange bottom section integral with the first flange top section and having a variable width $W_{FB1}$ that is equal to $W_{FT1}$ where the first flange top section joins the first flange bottom section and increases with distance from that point.

9. The apparatus of claim 1 wherein the second force transfer beam comprises:
a second flange having:
a second flange top section having a width $W_{FT2}$, and
a second flange bottom section integral with the second flange top section and having a variable width $W_{FB2}$ that is equal to $W_{FT2}$ where the second flange top section 735 joins the second flange bottom section 740 and increases with distance from that point.

10. The apparatus of claim 1 wherein the separation beam further comprises a separation beam stiffening flange integral to and perpendicular to the separation beam.

11. An apparatus comprising:
an A-frame structure having:
a force transfer vertex,
a first pivot vertex,
a second pivot vertex,
a first force transfer beam coupled between the force transfer vertex and the first pivot vertex,
a second force transfer beam coupled to the first end and coupled between the force transfer vertex and the second pivot vertex, and
a separation beam coupled to the first pivot vertex and the second pivot vertex;
a hydraulic assembly having a cylinder and a rod that is telescoped at least partially within the cylinder; and
wherein the rod is pivotally coupled to the force transfer vertex.

12. The apparatus of claim 11 wherein the A-frame structure is coupleable to an elongated tub and to an elongated frame.

13. The apparatus of claim 11 wherein the A-frame structure further comprises:
a mounting frame having:
a top mounting frame section pivotally coupled to the force transfer vertex and coupled to:
the first force transfer beam, and
the second force transfer beam;
a bottom mounting frame section pivotally coupled to the first pivot vertex and the second pivot vertex and directly coupled to:
the first force transfer beam, and
the second force transfer beam.

14. The apparatus of claim 13 wherein the cylinder passes between the separation beam and the mounting frame.

15. The apparatus of claim 11 wherein the first force transfer beam comprises:
a first flange having:
a first flange top section having a width $W_{FT1}$, and
a first flange bottom section integral with the first flange top section and having a variable width $W_{FB1}$ that is equal to $W_{FT1}$ where the first flange top section joins the first flange bottom section and increases with distance from that point.

16. The apparatus of claim 11 wherein the second force transfer beam comprises:
a second flange having:
a second flange top section having a width $W_{FT2}$, and
a second flange bottom section integral with the second flange top section and having a variable width $W_{FB2}$ that is equal to $W_{FT2}$ where the second flange top section joins the second flange bottom section and gradually increases with distance from that point.

17. The apparatus of claim 11 wherein the separation beam further comprises a separation beam stiffening flange integral to and perpendicular to the separation beam.

18. A method comprising:
coupling an elongated tub to an elongated frame by coupling a first set of mounting clasps to a first set of pivot hooks and by coupling a second set of mounting clasps to a second set of pivot hooks;
mounting an A-frame structure to a first end of an elongated tub, the A-frame structure having:
a first pivot vertex pivotally and releasably coupled to the elongated frame,
a second pivot vertex pivotally and releasably coupled to the elongated frame,
a force transfer vertex,
a first force transfer beam coupling the first pivot vertex to the force transfer vertex,
a second force transfer beam coupling the second pivot vertex to the force transfer vertex, and
a separation beam, separate from the elongated frame and the elongated tub, coupled to the first pivot vertex and the second pivot vertex;
uncoupling the first pivot vertex from the elongated frame;
uncoupling the first set of mounting clasps from the first set of pivot hooks; and
applying force to the force transfer vertex;
wherein the force applied to the force transfer vertex is directed along the first force transfer beam to the first pivot vertex and along the second transfer beam to the second pivot vertex, causing the force transfer vertex to move in an arc about the second pivot vertex, causing the elongated tub to pivot from a transport position, in which an open top is facing upward, to a dumping position in which the open top is facing away from one side of the elongated frame.

19. The method of claim 18 wherein applying the force comprises:
  applying force below a centroid of the first end of the elongated tub.

20. The method of claim 18 wherein applying the force comprises:
  applying force to a lower portion of a mounting frame, wherein the lower portion of the mounting frame is coupled to a lower portion of the first end of the elongated tub.

\* \* \* \* \*